US012741590B2

(12) United States Patent
Feldgen

(10) Patent No.: US 12,741,590 B2
(45) Date of Patent: Sep. 22, 2026

(54) LIGHTING MODULE FOR EXTERIOR LIGHTING OF VEHICLES

(71) Applicant: HELLA GMBH & CO. KGAA, Lippstadt (DE)

(72) Inventor: Michael Feldgen, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 170 days.

(21) Appl. No.: 18/678,372

(22) Filed: May 30, 2024

(65) Prior Publication Data

US 2024/0399957 A1 Dec. 5, 2024

(30) Foreign Application Priority Data

Jun. 2, 2023 (DE) ........................ 102023114563.0

(51) Int. Cl.
*B60Q 11/00* (2006.01)
*B60Q 1/00* (2006.01)
*H05B 45/10* (2020.01)
*H05B 45/52* (2020.01)
*B60Q 1/14* (2006.01)

(52) U.S. Cl.
CPC .......... *B60Q 11/005* (2013.01); *B60Q 1/0088* (2013.01); *H05B 45/10* (2020.01); *H05B 45/52* (2020.01); *B60Q 1/1415* (2013.01)

(58) Field of Classification Search
CPC .. B60Q 11/005; B60Q 1/0088; B60Q 1/1415; H05B 45/10; H05B 45/52
See application file for complete search history.

(56) References Cited

U.S. PATENT DOCUMENTS

| | | | | |
|---|---|---|---|---|
| 2009/0179582 | A1 | 7/2009 | Yang | |
| 2016/0227616 | A1* | 8/2016 | Lee | H05B 47/105 |
| 2019/0353336 | A1 | 11/2019 | Kreuter et al. | |
| 2020/0005564 | A1* | 1/2020 | Coburn | H05B 47/105 |
| 2021/0288585 | A1* | 9/2021 | Krzywinski | H02M 3/33584 |
| 2023/0096492 | A1* | 3/2023 | Owada | B60Q 9/00 362/459 |

FOREIGN PATENT DOCUMENTS

WO WO-2023009638 A1 * 2/2023 .............. B60L 58/16

* cited by examiner

*Primary Examiner* — Minh Tran
(74) *Attorney, Agent, or Firm* — WARNER NORCROSS + JUDD LLP

(57) ABSTRACT

The invention relates to a lighting module for exterior lighting of vehicles. The lighting module includes a housing with at least one light-emitting diode and/or at least one group of light-emitting diodes for generating high beam, low beam, side or marker light, parking light, turn signal light, fog light, cornering light and/or daytime running light. The lighting module includes at least one power input so that the at least one light-emitting diode or the at least one group of light-emitting diodes of the lighting module can be connected to an on-board power supply of a motor vehicle. The lighting module includes an interface for bidirectional communication, by means of which it can communicate with another identical lighting module according to the invention. The lighting module also includes a controller to process an incoming signal by means of the interface and/or to generate an outgoing signal by means of the interface.

8 Claims, 1 Drawing Sheet

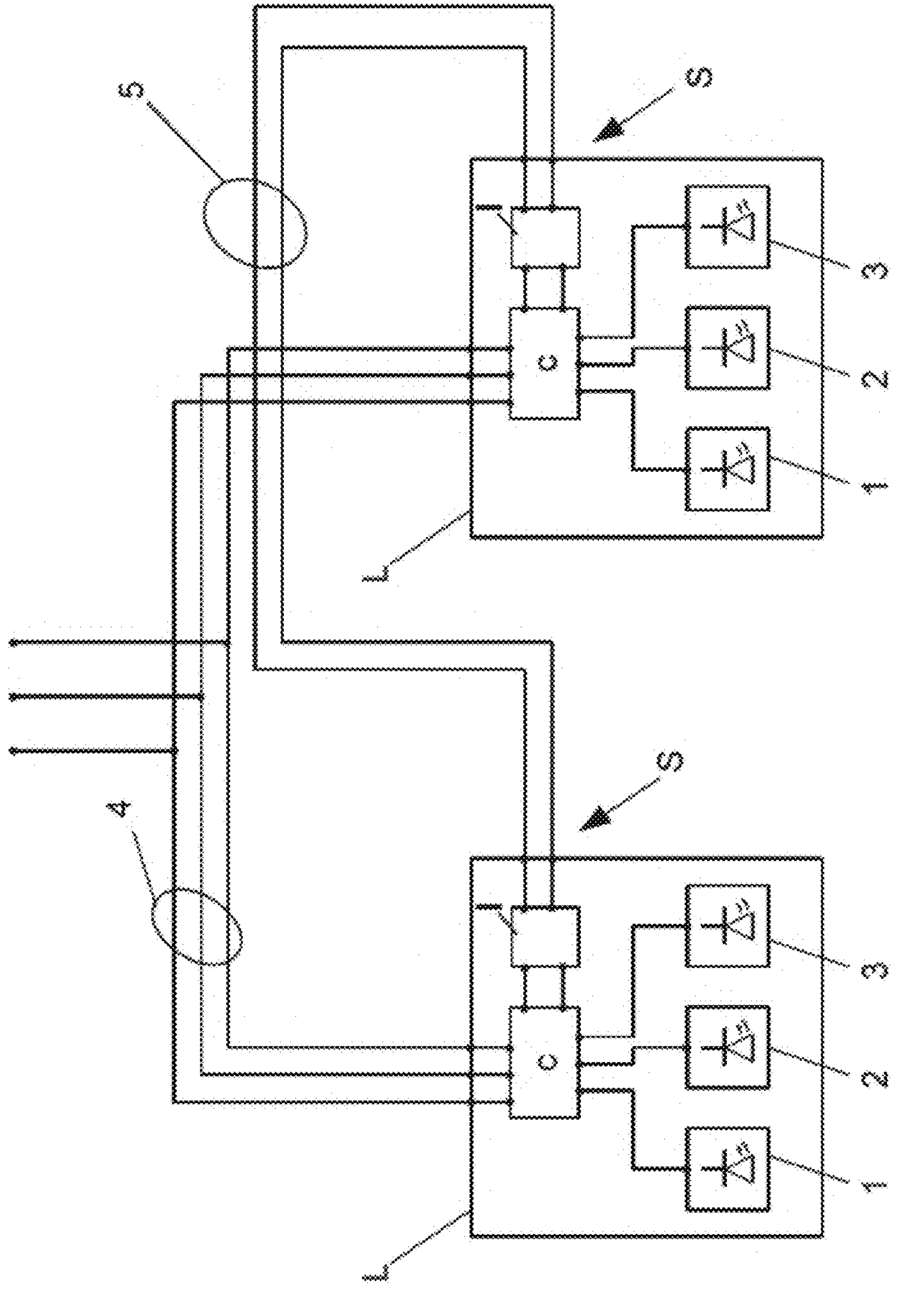
5
S
3
2
1
L
4
S
3
2
1
L

LIGHTING MODULE FOR EXTERIOR LIGHTING OF VEHICLES

CROSS-REFERENCE TO RELATED APPLICATIONS

The present application claims the benefit of German Patent Application No. 10-2023-114-563.0, filed Jun. 2, 2023, the disclosure of which is incorporated by reference.

BACKGROUND OF THE INVENTION

The invention relates to a lighting module for exterior lighting of vehicles. As set forth herein, the lighting module includes: (a) a housing; (b) at least one light-emitting diode and/or at least one group of light-emitting diodes for generating high beam, low beam, side or marker light, parking light, turn signal light, fog light, cornering light and/or daytime running light, which is arranged in the housing; and (c) at least one power input each by means of which the at least one light-emitting diode or the at least one group of light-emitting diodes of the lighting module can be connected to an on-board power supply of a motor vehicle.

These lighting modules can be fitted to the front, which is to say, on the left and right of vehicles of all classes, in particular on trucks, agricultural vehicles, construction vehicles, etc. These lighting modules can usually be used to generate light for turn signaling. The lighting module can then be used as a turn signal (blinker). In most cases, two further lighting functions are added, namely marker light and daytime running light. An individual LED or a group of LEDs can be used to generate light for various functions. It may also be that an individual LED or a group of LEDs is provided for each or some lighting functions. Vehicles are often equipped on each side of the vehicle with two same lighting modules. In some countries, this is even prescribed for certain types of vehicles. In particular, for particularly wide vehicles, it is often desirable or prescribed that two of these lighting modules are used as double modules on top of or next to each other at the front on each side of the vehicle due to increased requirements for exterior lighting of vehicles. These are then powered in parallel on the vehicle side by the same power supply lines, usually by means of a Y cable.

The invention therefore also relates to a motor vehicle with at least two of these lighting modules on the right and/or left front of the vehicle. The partial or complete failure of a lighting function, in particular, of a turn signal, for example, in the case of a high-impedance or short-circuited LED, must always be recognized by the vehicle and indicated to the driver. For this purpose, the current consumption is reduced to a value below a threshold value (for example, 50 mA) in the event of a failure in the lighting module. As a result, a control unit in the vehicle recognizes that there is a fault based on the reduced current.

If two same lighting modules are now used in a vehicle on one side of the vehicle, for example as a double module, the current consumption of this lighting mode is reduced below the threshold value if a lighting function fails in one of the two lighting modules on one side of the vehicle, if the same lighting function is, however, intact in the other of the two lighting modules, the current consumption is not reduced there. On the vehicle side, a total current above the current threshold continues to be supplied to both lighting modules by means of the Y cable. For this reason, a diagnostic unit in the control unit of the vehicle does not detect the failure of the lighting function in one of the lighting modules. The requirement can however be required or even prescribed by law that the failure of the lighting function in only one of the lighting modules be recognized as a fault and indicated to the driver. Both lighting modules are regarded as an individual unit, wherein the failure of the lighting function in one of the two lighting modules can already be recognized as a fault of both lighting modules and represents a failure of both lighting modules that must be indicated. With the known lighting modules, this cannot be achieved with a parallel supply, for example by means of a Y cable.

A further problem can occur if two same lighting modules are used on one side of the vehicle, for example as a double module, if the light emitted by both lighting modules combined is greater than that prescribed for one of the lighting functions. Both modules together then produce light that is too bright. What is needed here is a solution that reduces light generation.

SUMMARY OF THE INVENTION

The invention is based on the task of modifying a lighting module so that it can be operated safely together with a second, same lighting module on one side of the vehicle. This task is solved in accordance with the invention in that the lighting module comprises an interface for bidirectional communication, by means of which it can communicate with a same lighting module according to the invention, and in that the lighting module comprises a controller to process an incoming signal by means of this interface and/or to generate an outgoing signal by means of the interface.

It is possible by mean of this bidirectional interface that two lighting modules according to the invention exchange information with each other. Information about the status of one lighting module can, for example, be sent to the other lighting module and one lighting module can receive information about the status of the other lighting module. The information can be the presence of a fault in a lighting function, the type of fault in a lighting function, the absence of a fault in a lighting function and so on. The information received can then be processed in the controller and the controller can then control, in particular switch off or dim, the at least one LED or the at least one group of LEDs depending on the information received.

If, for example, a lighting function of the other lighting module has failed and this failure is indicated by the other lighting module at its bidirectional interface, the lighting module can switch off or dim the LED or the group of LEDs intended for the same lighting function, in order to reduce the current consumption. The total current consumption of the two lighting modules is then reduced in such a way that a fault in this lighting function can be detected by a control unit of the vehicle. The control unit of the vehicle can then report the fault to the driver.

It is likewise possible, for example, that if the same lighting function of both lighting modules is working perfectly, this is communicated to the other lighting module by means of the interface. If the light generated by the LEDs or groups of LEDs intended for this lighting function is then too bright, the light can be dimmed by the controls of the lighting modules so that it does not exceed the overall brightness intended for this lighting function.

The interface for bidirectional communication can comprise an input connection by means of which an incoming signal from the other lighting module can be received in the lighting module. The interface for bidirectional communication can, moreover, comprise an output connection by means of which an outgoing signal can be issued from the lighting module to the other lighting module. In the lighting module, the input connection and/or the output connection can be connected to the controller of the lighting module. The input connection and/or the output connection can be part of a plug connector. The plug connector can be a device plug or a socket that is installed in a wall of the housing.

The controller of a lighting module can be used to generate an outgoing signal that indicates a fault in a lighting function of the lighting module. The controller can also be used to generate an outgoing signal that indicates which lighting function of the lighting module has a fault. It is, moreover, possible that an outgoing signal can be generated by means of the controller, which outgoing signal indicates a faultless functioning of the lighting function or lighting functions of the lighting module.

An incoming signal can moreover be processed by means of the controller. The controller can then dim or switch off the LED or group of LEDs for a lighting function based on the incoming signal. This makes it possible to ensure that a certain current consumption is not exceeded by the two lighting modules and/or that a certain brightness is not exceeded for a lighting function. The dimming of the LED or the group of LEDs can be carried out in a lighting module according to the invention using pulse width modulation.

The input connection and/or the output connection of the interface is connected to the controller by means of an impedance converter. The lighting module can be a built-in lighting module which is integrated into the body of the vehicle, or a surface-mounted lighting module which may also be subsequently attached to the body of the vehicle.

BRIEF DESCRIPTION OF THE DRAWING

An embodiment of an arrangement with two lighting modules according to the invention, which are connected to each other, is described in more detail in the drawing, in which:

FIG. 1 shows a schematic representation of the arrangement.

DETAILED DESCRIPTION OF THE CURRENT EMBODIMENTS

The two lighting modules L are electrically connected in parallel by means of a Y line 4 to an on-board electrical system of a motor vehicle that is not shown. The two lighting modules L are identical.

The two modules L each comprise a plug connector for input for the supply voltage. Connectors of the Y line are plugged into these connectors. The input is connected to a controller C within the modules L. The Y line is represented with two wires. It can, however, comprise more than two wires. In this case, the plug connectors for input for the supply voltage also have more than two contacts.

Each module L comprises three groups 1, 2, 3 of LEDs which are connected to the controller C and which are powered by the controller C. The controller C can switch the LED groups 1, 2, 3 on and off and dim them. The LED groups are provided for different lighting functions. In this manner, LED group 1 forms a blinker, whereas a marker light can be generated with LED group 2 and a daytime running light can be generated with LED group 3.

Each module L moreover comprises an interface S, by means of which the module L is connected to the other module L. For this purpose, the ends of an interface cable 5 are connected to the interface S. The interface S is connected to the controller C within each module L. Each interface S comprises an input connection and an output connection. The input connection of the interface S of one module L is connected to the output connection of the interface S of the other module L. The output connection of one module L indicates when the controller C of one module L detects a failure of LED group 1, which is to say, the blinker. This information can then be imported into the other module L by means of the input connection of the interface S of the other module L and processed in the controller C of the other module. The controller C of the other module L then switches off the first LED group of the other module 1. This combined current consumption of both modules L is reduced to such an extent that the control unit of the vehicle can register the partial failure of the modules and indicate it to the driver of the vehicle.

LIST OF REFERENCE NUMERALS

L lighting module
1 first LED group/blinker
2 second LED group/marker light
3 third LED group/daytime running light
C controller of the lighting module
S interface
I impedance converter
4 Y line
5 interface cable The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A lighting module for exterior light of a vehicle, the lighting module comprising:

a housing;

at least one light-emitting diode arranged in the housing for generating high beam, low beam, side or marker light, parking light, turn signal light, fog light, cornering light, or daytime running light;

at least one power input by which the at least one light-emitting diode receives power from an on-board power supply of a motor vehicle;

an interface for bidirectional communication by which the lighting module communicates with a further lighting module of the identical type; and a controller configured to process an incoming signal from the further lighting module related to a lighting function of the further lighting module via the interface and configured to generate an outgoing signal to the further lighting module related to a lighting function of the lighting module via the interface, wherein the controller is further configured to detect a fault in the lighting function of the further lighting module via the incoming signal and, in response thereto, cause an identical lighting function of the lighting module to be dimmed or switched off.

2. The lighting module of claim 1, wherein the lighting module is a built-in light module or a surface-mounted lighting module.

3. The lighting module of claim 1, wherein the interface comprises an input connection by which the incoming signal from the further lighting module is received.

4. The lighting module of claim 3, wherein the interface comprises an output connection by which the outgoing signal is sent to the further lighting module.

5. The lighting module of claim 4, wherein the input connection and the output connection is connected to the controller.

6. The lighting module of claim 4, wherein the input connection and the output connection are connected to the controller via an impedance converter.

7. The lightning module of claim 1, wherein the outgoing signal indicates a faultless functioning of a lighting function.

8. A motor vehicle including a first lighting module and a second lighting module, wherein the first and second lighting modules comprise the lighting module of claim 1, and wherein the interface of each of the first and second lighting modules are connected to each other.

* * * * *